United States Patent [19]

Johnsen

[11] Patent Number: 4,958,512
[45] Date of Patent: Sep. 25, 1990

[54] METHOD AND A DEVICE FOR USE IN DETERMINING CONDITIONS OF RUNWAY FRICTION AND BRAKING

[76] Inventor: Oddvard Johnsen, Eikesvingen 8, N-3400 Lier, Norway

[21] Appl. No.: 333,425

[22] Filed: Apr. 4, 1989

[30] Foreign Application Priority Data

Apr. 7, 1988 [NO] Norway ................................ 881513

[51] Int. Cl.$^5$ ............................................ G01N 19/02
[52] U.S. Cl. ............................................ 73/9; 73/146
[58] Field of Search ................................ 73/9, 10, 146

[56] References Cited

U.S. PATENT DOCUMENTS

| | | | |
|---|---|---|---|
| 2,700,297 | 1/1955 | Allen | 73/9 |
| 3,893,330 | 7/1975 | Shute et al. | 73/9 |
| 3,977,243 | 8/1976 | Yamada et al. | 73/146 |
| 4,001,642 | 1/1977 | Skoyles et al. | 361/238 |
| 4,098,111 | 7/1978 | Hardmärk et al. | 73/9 |
| 4,545,240 | 10/1985 | Leiber | 73/146 |
| 4,662,211 | 5/1987 | Strong | 73/9 |
| 4,779,447 | 10/1988 | Rath | 73/9 |
| 4,909,073 | 3/1990 | Takahashi et al. | 73/9 X |

FOREIGN PATENT DOCUMENTS

| | | | |
|---|---|---|---|
| 1-32173 | 2/1989 | Japan | 73/9 |
| 413082 | 4/1980 | Sweden | |
| 1532417 | 11/1978 | United Kingdom | |
| 1555905 | 11/1979 | United Kingdom | |

OTHER PUBLICATIONS

"Methods of Testing Friction-Braking Pairs"; *Russian Engineering Journal*, vol. VIII, No. 1; pp. 16-17, B. G. Keglin et al.; in 73/9; 1973.

*Primary Examiner*—Tom Noland
*Attorney, Agent, or Firm*—Merchant, Gould, Smith, Edell Welter & Schmidt

[57] ABSTRACT

In order to determine conditions of runway friction by measuring and recording forces acting on a braked wheel rolling on a runway, a vertical force and a horizontal force are exerted on the wheel, the horizontal force being provided by braking the wheel. The forces are recorded directly and the friction coefficient and its sense of change are determined on the bases of recorded values and by the fact that the braking force is continuously changed, to find the peak of the friction coefficient/slip-curve.

1 Claim, 5 Drawing Sheets

METHOD AND A DEVICE FOR USE IN DETERMINING CONDITIONS OF RUNWAY FRICTION AND BRAKING

BACKGROUND OF THE INVENTION

The invention relates to a method and a device for use in determining conditions of runway friction and braking, comprising measurement and detection of forces acting on a braked wheel which rolls on the runway.

The invention is especially developed in connection with the necessity of being able to measure the coefficient of friction between a wheel and a runway, especially between pneumatic tires and the surface of runways and roads. Said coefficient depends on weather conditions and may, thus, show much variation. Accurate information on the actual value is of considerable interest to airmen in connection with departure and landing, because it permits maximum braking, at the same time as skidding is avoided. Such information will also be suitable in assessing roads and vehicle tires.

FIELD OF THE INVENTION

Devices measuring the friction between one or a number of wheels and runways are previously known, but they provided insufficient inaccurate results, causing aircraft to land under conditions which should have precluded landing. Conversely, runways occasionally were closed after friction measuring even though conditions were such that aircraft might have been permitted to land.

Previously known friction measuring devices for airfields and roads are, e.g. disclosed in SE-PS No. 407 856, DE-PS No. 27 42 110, and in GB-PS Nos. 1 532 417, and 1 555 905. Some of these devices measure the frictional force of a braked wheel at a certain slip-factor of the latter. The slip-factor is an expression of a rotating wheel slipping or sliding on the support. A wheel must have a slip-force to transfer horizontal forces when rolling.

The slip-factor in this connection is defined as $$\frac{n_k - n_b}{n_k}$$

where $n_k$=rpm of a freely rotating wheel and
$n_b$=rpm of a braked-down wheel.

In the above expression the slip-factor is a number between 0 and 1. The slip-factor may also be expressed as a percentage $$\frac{(n_k - n_b) \, 100}{n_k}$$

and the slip-factor will then be a number between 0 and 100.

Thus, 100% slip, means a locked, braked-down wheel and 0% means no braking of the same wheel.

On runways friction measurements are commonly made with a slip-factor between 15% and 17%. Frictional forces obtained with such measurements will, however, only be true for certain runway/road conditions.

The slip-factor which provided maximum runway friction proved to be lower in case of dry summer conditions, and higher for slippery winter conditions.

DESCRIPTION OF THE RELATED ART

Lockup-free braking systems permit better braking for a vehicle on wheels by reducing the braking force which acts on a wheel if said wheel tends to lock in a manner that would result in slip initiation after activation of the brake, after which said systems again provide an increased braking force without requiring any change of the actual braking operation (by a person using the brakes) which caused braking. Such braking systems are advantageous to reduce the hazard of swerving due to wheel lockup, and to maintain steering capacity during braking, and may also provide a reduced stop distance. When a braking force is supplied to a running wheel to reduce the speed of a vehicle, a certain percentage slip is introduced, i.e. the braked wheel tends to rotate more slowly than the free rolling speed of the wheel to maintain driving speed, and this is due to frictional force between tire and supporting runway. When the braking force is increased, said frictional force is also increased and followed by an increase of percentage slip until frictional force reaches a maximum at a percentage slip (slip factor) commonly constituting between 10% and 20%. Then the frictional force will decrease in case of further increase of braking force, and the slip factor increased to 100% with lockup of the braked wheel.

From SE No. 394,984 a lockup-free braking system is known where the braking force is controlled in such a manner that the wheel is kept rolling within the range of maximum frictional force between tire and runway, i.e. within the range for obtaining optimum slip. An electrical control circuit is used to detect states of threatening wheel lockup due to far too powerful braking, with an electromagnetic valve influenced by said control circuit to reduce the liquid pressure of the brake. More precisely, said known concept is based on use of means for providing a DC voltage signal the amplitude of which is a function of wheel speed, in order to provide a speed change reference parameter which is representative of a selected wheel retarding value, and to determine a selected percentage of momentary value of the DC voltage signal, within a range of wheel speed, and depending on said momentary value, thus, to determine the actual speed of the wheel for which said momentary value is true. A signal of lockup-free braking will result from a change of the momental value of the DC voltage signal, exceeding the selected percentage and occurring with a velocity of change which exceeds the reference parameter of velocity of change. The means to provide a reference parameter of velocity of change comprises a derivative circuit generating a velocity change voltage of the DC voltage signal, and the means to determine a selected percentage of the momentary value of the DC voltage signal comprises a resistance connected to produce a voltage figure when a current passes through, caused by the voltage of velocity of change, with said voltage drop having a value which is representative of the selected percentage when the voltage of velocity change reaches a given momentary value.

From SE No. 413,082 a slip preventing control device for braking a vehicle is known. Here too, the preferred aim is to maintain slip within a region which is coordinated with a maximum runway friction coefficient. Periodic modulation of the wheel moment is used in connection with measurement of wheel acceleration to determine the direction of change of runway friction coefficient from an optimum value as a function of slip, and an integral and proportional control of pulse modulation permits compensated variation of the wheel moment and state of slip to a state of optimum frictional force. The control device may be used to prevent the vehicle from skidding, not only during braking, but also during acceleration.

From SE No. 382,781 a method is known to prevent lockup of vehicle wheels. The rate of pressure change in the brake cylinder and of frictional force between wheel and runway are produced in the form of electric values, and the pressure in the brake cylinder is controlled by said values so that it may only increase when there is a simultaneous increase of frictional force between wheel and runway, and correspondingly will decrease in case of decreasing frictional force between wheel and runway.

SUMMARY OF THE INVENTION

It is an object of the invention to provide a method and a device for derivation of values to determine runway friction and braking/traction ratios dependent on prevailing conditions, by measuring forces and computing the frictional value. The slip factor providing maximum runway friction is sought by measuring friction for any road condition. Such a friction measuring device comprises a wheel, if desired a free-wheeling wheel, and a braked wheel. The revolutions per minute (rpm) of both wheels may be recorded, and the acting forces are recorded, so that it is possible to determine the coefficient of friction/slip-factor curve. The friction measuring device will seek the slip-factor providing maximum runway friction.

The friction measuring device, however, may be arranged to measure runway friction at an adjustable slip-factor which is, however, kept constant during each measuring operation, and it is able to measure friction in case of locked-up wheels (100% slip), as well as roll resistance or drag when a runway is, e.g. covered by a layer of snow and slush. Information on drag will, e.g. be of interest to the pilot in an aircraft during departure.

When the invention is utilized for an optimally acting braking, or measuring system, the reference wheel (free-wheeling) may be omitted. Braking forces are controlled via a control unit receiving signals from a dynamometer connected to the braked wheel.

In case of traction, driving wheels will, correspondingly, be driven by a respective servo motor if power from the main engine is determined by a control unit which receives signals from a dynamometer associated with the actual wheel.

By the aid of the present invention automatic finding of the optimal braking/traction force is, thus, achieved on any surface.

BRIEF DESCRIPTION OF THE DRAWINGS

The invention will be disclosed in more detail below, with reference to the drawings, where.

DESCRIPTION OF THE PREFERRED EMBODIMENT

The ability to stop a vehicle is, in principle, determined by the properties of the contact surface between runway and tire, and such properties are often represented by the friction coefficient, $\mu$, which is defined as the ratio between the frictional force resisting movement between both surfaces, and the force between the surfaces normal to them (i.e. the force normal to the desired movement). In case of rolling surfaces $\mu$ is, furthermore, a function of the slip parameter which is defined above.

Figure 1:
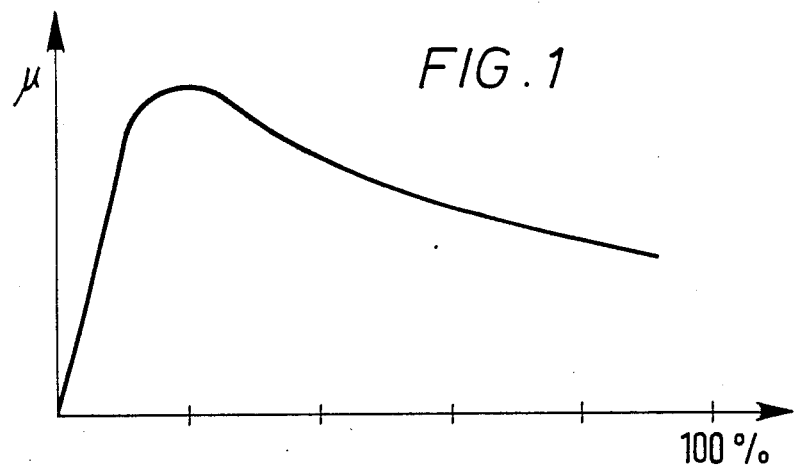
FIG. 1 shows a typical friction coefficient/slip curve.

It is known that variation of the friction coefficient with slip for many different kinds of runways and tires generally follows the curve of $\mu$, shown in FIG. 1, as a function of slip. An important characteristic of said curve is that $\mu$ has a maximum value. The special shape of the curve is of no consequence, because it may vary with conditions, inter alia, velocity within wide limits. The fact that there is a maximum value means that the performance of the anti-skidding braking system should, preferably, cause braking at said maximum value if a minimum stop distance (maximum stopping power) is desired.

Figure 2:
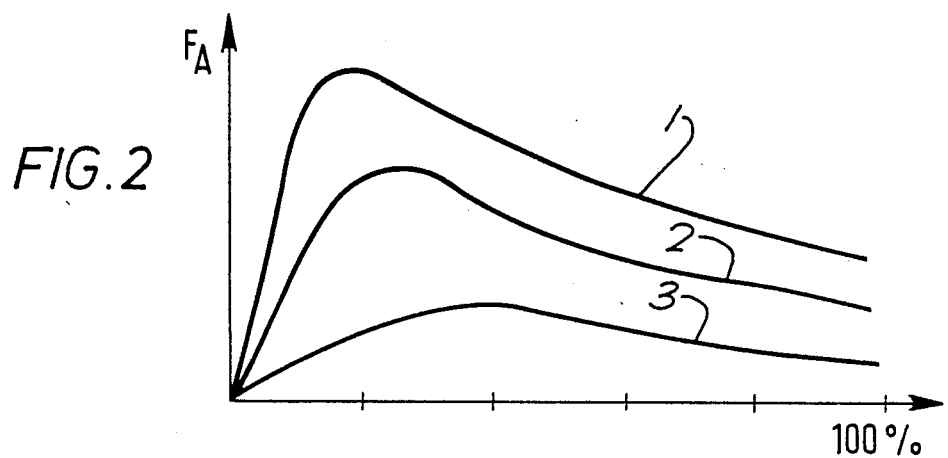
FIG. 2 shows typical frictional force/slip curves.

FIG. 2 shows a diagram of typical braking force/slip curves for roads or runways having different friction coefficients ($\mu$) with a vehicle tire.

Curve 1 represents a runway with a typical high $\mu$-value (e.g. $\mu=1$), curve 2 represents a runway with an average $\mu$-value (e.g. $\mu=0.5$), and curve 3 represents a runway with a typical low $\mu$-value (e.g. $\mu=0.1$).

If minimum stop distance (maximum braking) is increased, the braking force must, thus, be controlled to cause the wheel to roll within the region of maximum friction force $F_A$ between tire and runway, i.e. within the region where optimum slip (percentage) is achieved.

Figure 3:
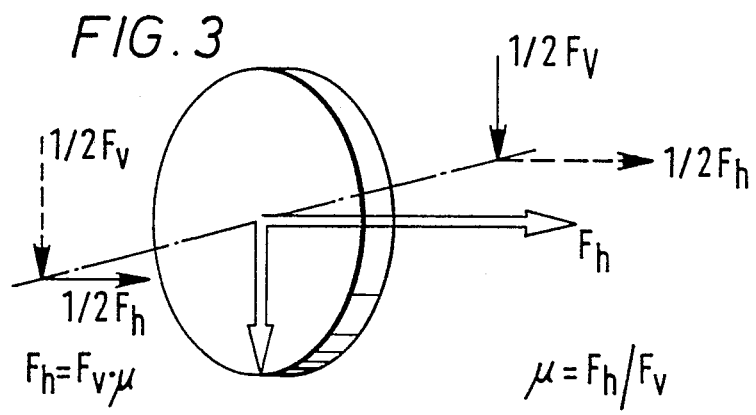
FIG. 3 illustrates the principle utilized according to the invention.

To explain friction measuring according to the invention reference is at first made to FIG. 3.

In order to measure the friction coefficient correctly the vertical force $F_V$, and the variable horizontal force $F_H$ (produced when the wheel is braked) must be known.

By the aid of suitable sensors (load cells connected to the wheel shaft) both vertical, and horizontal forces may be detected. The friction coefficient is computed in a computer. A printer is used for documentation.

In FIG. 3 the load cell for measuring vertical force is located on one side of the wheel, whereas the load cell for measuring horizontal force is located on the other side of the wheel. Said load cells, thus, only detect half of the respective force. In the computer this is taken into account by multiplication of the value by 2.

Figure 4:
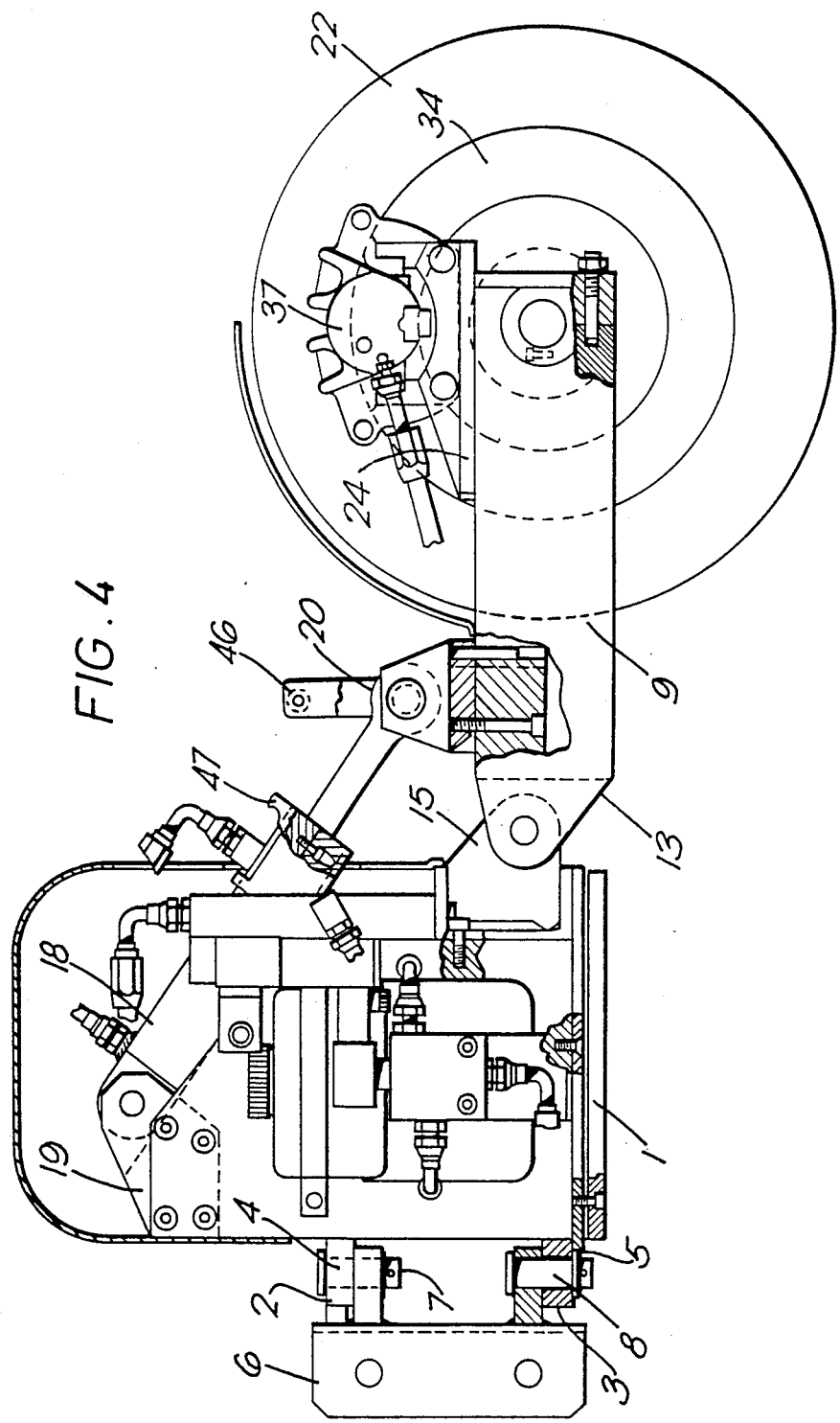
FIG. 4 is a side elevation of a friction measuring carriage according to the invention.
Figure 5:
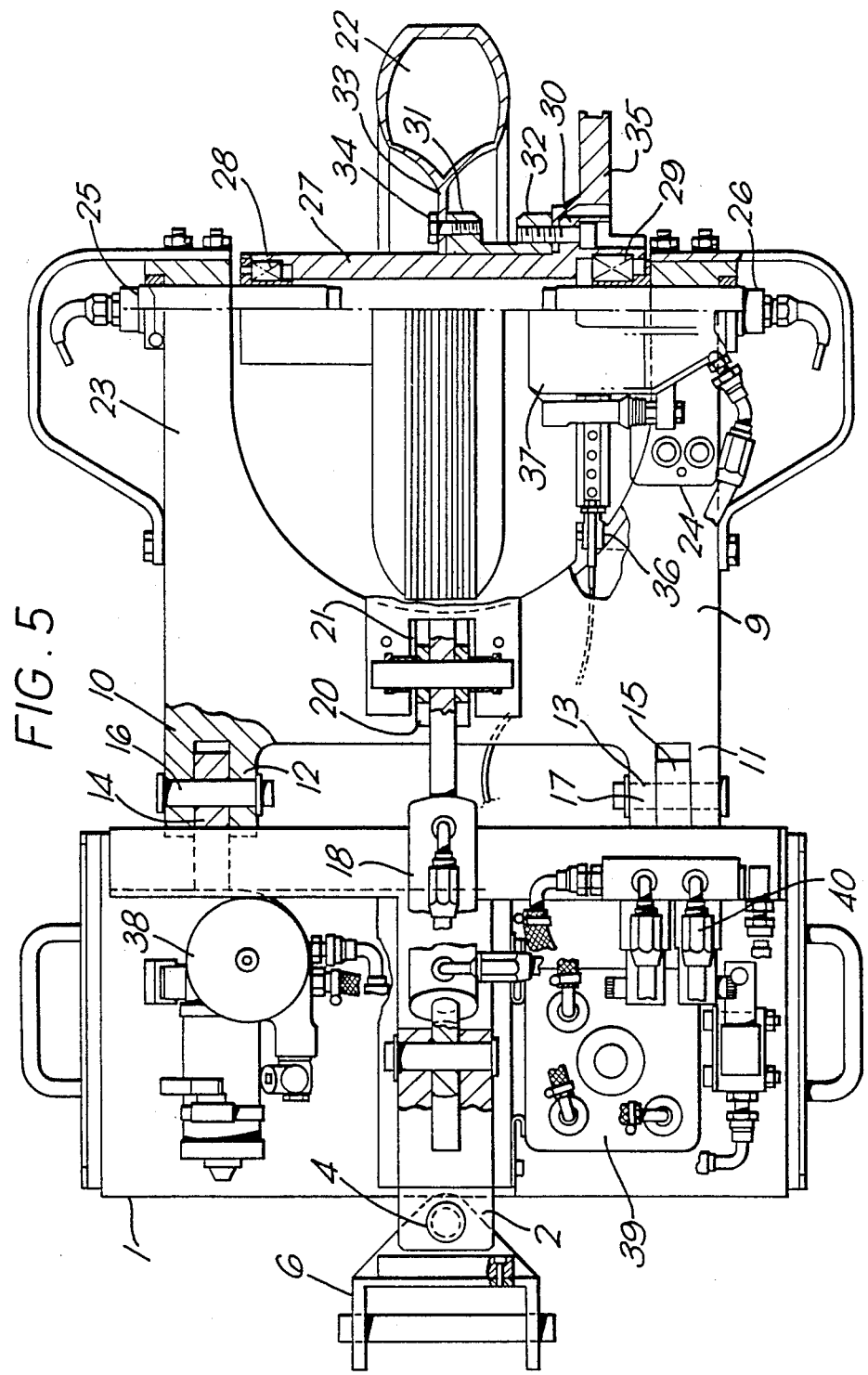
FIG. 5 is a plan view of the carriage of FIG. 4.

We now refer to FIGS. 4 and 5 which show a carriage intended for friction measuring. The friction measuring carriage shown in FIGS. 4 and 5 comprises a main body 1. Said main body is provided with brackets 2, 3, each having an aligned bore 4, 5. A connecting bracket 6 is pivoted by pivots 7, 8 in brackets 2, 3. Said connecting or securing bracket is intended for connection with a vehicle (not shown) which is used for traction of the friction measuring carriage.

Said carriage, furthermore, comprises a forked supporting frame 9. At its front edge (towards main body 1) said supporting frame 9 has two projecting fork brackets 10, 11 with mutually aligned horizontal bores 12, 13. Fork brackets 10, 11, as shown, encompass two projecting lugs 14, 15 on main body 1 and are pivotally connected with the main body by bolts 16, 17 inserted in bores 12, 13.

A hydraulic working cylinder 18 is clamped between main body and supporting frame. In this embodiment said hydraulic working cylinder 18 is pivotally mounted in a bracket 19 on main body 1, whereas piston rod end 20 is pivotally mounted at 21 in supporting frame 9. When piston rod end 20 is extended, and retracted, respectively, supporting frame 9 is made to swing about pivots 16, 17, and when main body 1 is secured to the traction vehicle by the aid of securing bracket 6, hydraulic working cylinder 18 may be used to exert a desired vertical force on wheel 22, i.e. it is possible to set the vertical force exerted by wheel on its support. Wheel 22 is rotatably mounted in supporting frame 9. To this end the supporting frame is shaped with two fork arms 23, 24. In each arm 23, 24 there is a horizontal bore where a load cell 25, 26, respectively is inserted. A wheel hub sleeve 27 is rotatably mounted on load cells 25, 26 by the aid of a ball bearing 28, and 29, respectively. Wheel hub sleeve 27 is provided with an end flange 30 onto which a wheel hub 31 is secured by the aid of bolts 32. Wheel rim 33 is secured to hub 31 by bolts 34. A disk brake 35 is clamped onto wheel hub sleeve 27 by the aid of bolts 32, disk 35 sitting between flange 30 and wheel hub 31, as shown. Disk 35 is connected with a pulse counter 36 and is, thus, used as part of a tachometer for measuring the rpm of wheel 22. The brake collar of the disk brake is designated 37.

On main body 1 a hydraulic pump unit 38 is provided with a hydraulic reservoir 39. Hydraulic proportional valves for controlling hydraulic working cylinder 18 and disk brake 37 are also provided on main body 1 and are designated 40. Said valves are provided with magnetic control.

The performance of the friction measuring carriage will be explained in more detail below with reference to FIG. 6, which roughly shows the hydraulic and signal circuits necessary for friction measuring.

The carriage which mainly comprises main body 1, and supporting frame 9, is hooked onto a traction vehicle by the aid of securing bracket 6. The carriage comprises necessary units, and valves and will, thus, only require connection with the power supply of the traction vehicle, and connection with a computer on said traction vehicle. If desired, power supply (battery) as well as computer may, obviously be provided on the carriage proper.

The carriage is levelled, i.e. supporting frame is by the aid of work cylinder 18 adjusted to level load cells 25, 26 for detection of vertical, and horizontal forces, respectively, in the wheel hub.

The desired vertical force is achieved and maintained by the aid of hydraulic working cylinder 18. The traction vehicle will pull the carriage, causing wheel 22 to roll on the support. Wheel 22 is braked by the aid of brake 37. By the aid of load cells 25, 26 the vertical force, and the horizontal force on the wheel are currently detected. The detected values are supplied to a computer 41 (FIG. 6), where the current friction coefficient and its sense of change are computed. From computer 41 feedback goes to valves 40 controlling the braking force. This peak value is stored, and may be viewed on display 42, or appear on printer 43, respectively.

Figure 6:
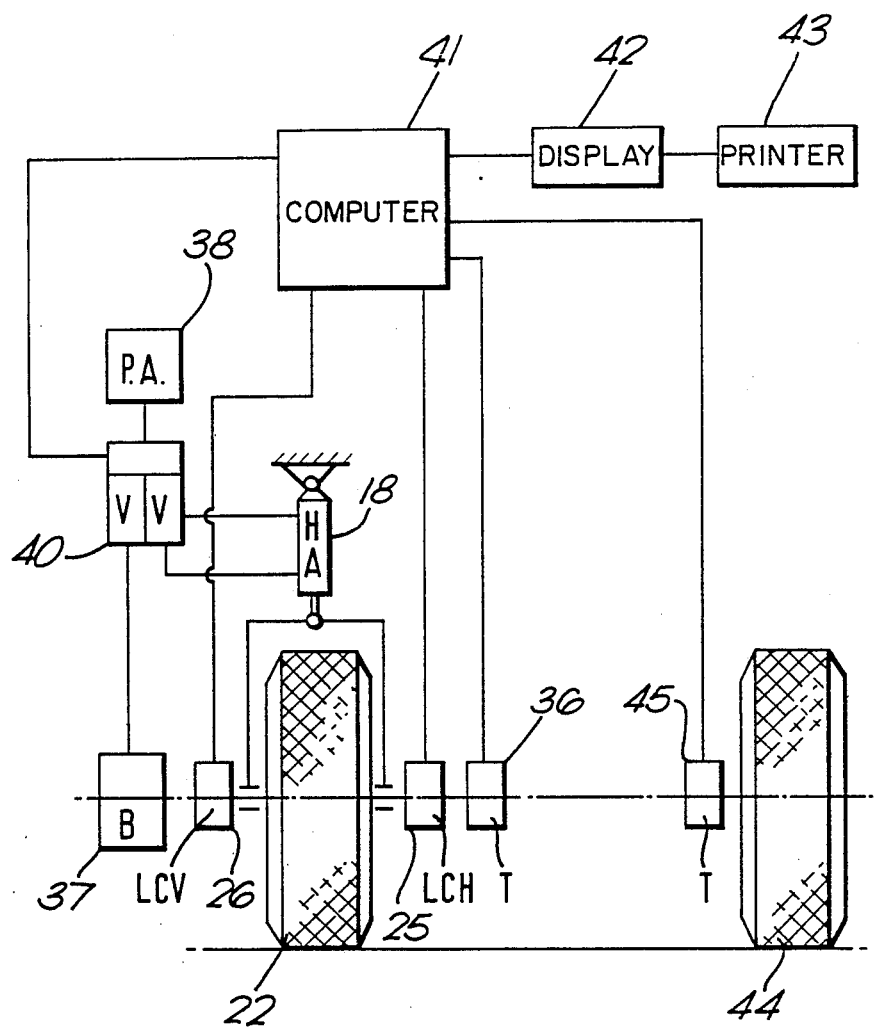
FIG. 6 is a diagrammatical view of hydraulic circuits, and signal circuits used in carriage of FIGS. 4 and 5.

In FIG. 6 a wheel 44 is shown. This is a reference wheel which may, preferably be one of the free-wheeling wheels of said traction vehicle. Reference wheel 44 is used when the slip factor is of interest, e.g. when it is desirable to drive with a slip factor which is fixed or variable, but fixed at the moment of measuring. Reference wheel 44 is, thus, connected with a tachometer 45, like measuring wheel 22, e.g. a tachometer of the same basic structure as tachometer 35, 36 on the friction measuring carriage. Both tachometers 36, 45 are connected with the computer which is provided with a comparator.

It will appear from the above that the system is ready for use when the carriage is connected with the traction vehicle. It is assumed that the computer has a simple program for computing the friction coefficient. Measuring wheel 22 is kept in contact with the support by the aid of a constant pressure which is programmed in the computer. In the shown embodiment pressure is exerted by hydraulic working cylinder 18, and proportional valves 40.

Ground pressure is constant during all measuring operations, whereas disk brake 37 receives varying power. The computer will steadily solve the simple friction equation, and by the aid of display 42, or printer 43, respectively, it will be possible to receive the running value of the friction coefficient.

The computer will find the peak of the friction coefficient/slip curve all the time, using the detected horizontal force for a reference. The friction measuring carriage may also be used for measuring with a predetermined slip-factor. The computer will then control measuring wheel 222, i.e. the brake force until the desired slip-factor is reached. The slip-factor may be selected from 0% to 100% in relation to free-wheeling reference wheel 44.

The carriage may also be used for measuring roll resistance. The horizontal load cell will scan the roll resistance acting on free-wheeling measuring wheel 22, and the computer will convert the sensed values to a scale from 0.00 to 1.00 (increasing values indicating higher resistance).

When no measuring takes place, measuring wheel 22, i.e. supporting frame 9 may be turned up by the aid of working cylinder 18. Supporting frame 9 can then suitably be hooked by a catch hook 46 onto a corresponding hook 47 on the casing of working cylinder 18.

A special advantage of the carriage according to the invention is that it is designed practically as a separate unit which may readily be moved from one vehicle to another, and that utilization of the carriage only requires a minimum of intervention in the traction vehicle.

Pulse counter 36 is used even when no reference wheel is utilized, since the values recorded by said pulse counter are supplied to the computer and are derived to protect against lock-up.

In the shown embodiment two load cells are used, one for measuring horizontal force, and one for measuring vertical force. The load cells may, obviously, be combined, i.e. be designed as a unit.

Figure 7:
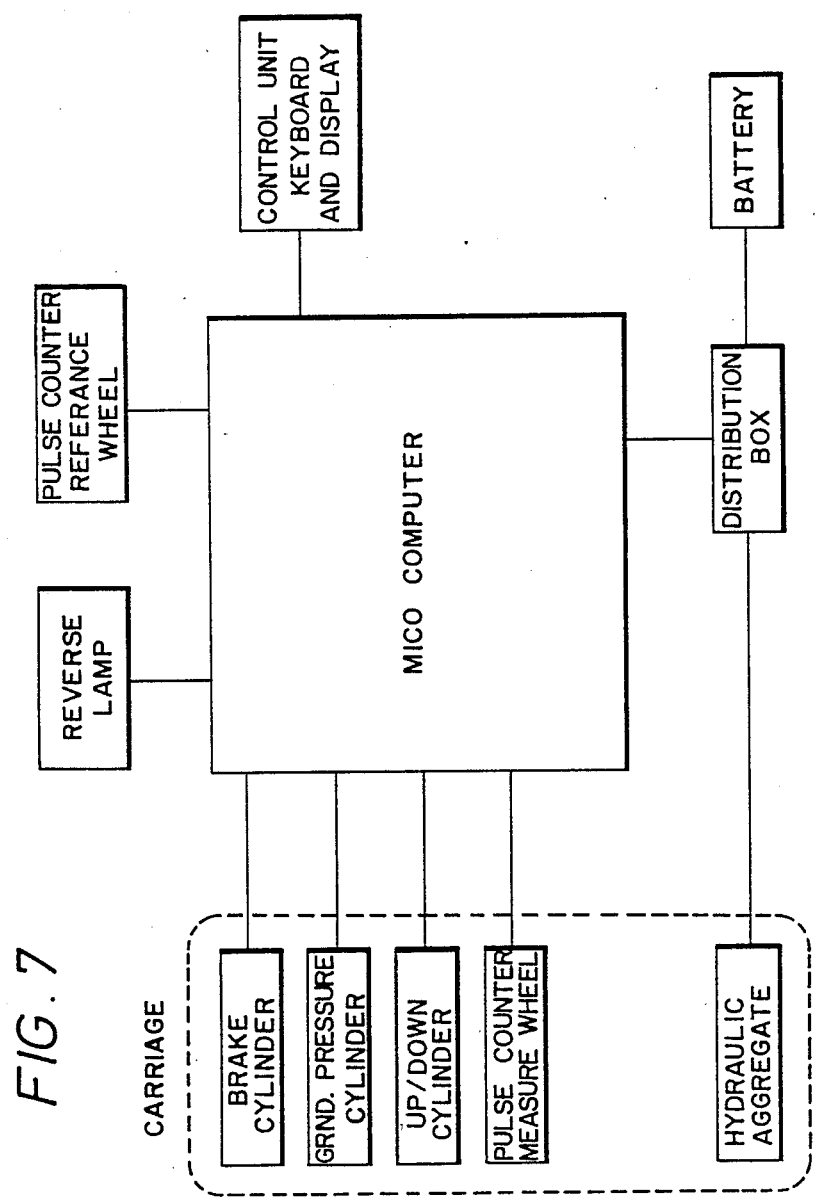
FIG. 7 is a block diagram of the friction measuring carriage.

In FIG. 7 a block diagram of the friction measuring carriage is shown.

An essential advantage of the invention, as compared with previously known technology, is that there is no demand on velocity of the measuring wheel, because forces are measured. This will be vital, especially in a braking and traction system.

The friction measuring carriage may advantageously be used for testing tire designs, and rubber mixtures in vehicle tyres. Experiments proved that the measuring device according to the invention is able to distinguish most accurately between grip efficiency of different tires.

Having described my invention, I claim:

1. A method of determining maximum runway friction from the sense of change of the coefficient of friction under actual conditions, comprising measurement and recording of forces acting on a braked wheel rolling on a runway, characterized in that a vertical force, and a horizontal force are exerted on a rolling wheel, said horizontal force being provided by wheel braking, that said forces are recorded directly, the friction coefficient between said rolling wheel and the runway and a sense of change thereof are determined solely on the basis of the recorded force values, and that the braking force is continuously changed to find a peak of a curve defined by friction coefficient versus slip values, which corresponds to the maximum coefficient of friction between the runway and said wheel under actual conditions.

* * * * *